United States Patent [19]
Haynes

[11] Patent Number: 5,484,997
[45] Date of Patent: Jan. 16, 1996

[54] IDENTIFICATION CARD WITH RF DOWNLINK CAPABILITY

[76] Inventor: George W. Haynes, 101 Summit Blvd., Englewood, Colo. 80110

[21] Appl. No.: 251,637

[22] Filed: May 31, 1994

Related U.S. Application Data

[63] Continuation-in-part of Ser. No. 162,759, Dec. 7, 1993, abandoned.

[51] Int. Cl.$^6$ .......................... G06K 16/06; G07B 15/02
[52] U.S. Cl. ............................. 235/492; 235/384
[58] Field of Search ................... 235/487, 491, 235/492, 380, 375, 384, 385

[56] References Cited

U.S. PATENT DOCUMENTS

| | | | |
|---|---|---|---|
| 3,090,042 | 1/1962 | Kleist et al. ........................ | 343/6.5 |
| 4,149,127 | 4/1979 | Murakami et al. ................. | 331/96 |
| 4,575,621 | 3/1986 | Dreifus .............................. | 235/380 |
| 4,600,829 | 7/1986 | Walton ............................... | 235/492 X |
| 4,650,981 | 3/1987 | Foletta ............................... | 235/449 |
| 4,701,601 | 10/1987 | Francini et al. .................... | 235/449 |
| 4,707,669 | 11/1987 | Mekata et al. ..................... | 331/96 |
| 4,791,283 | 12/1988 | Burkhardt .......................... | 235/438 |
| 4,912,471 | 3/1990 | Tyburski et al. ................... | 342/42 |
| 4,916,296 | 4/1990 | Streck ................................ | 235/454 |
| 4,960,983 | 10/1990 | Takesi ................................ | 235/449 |
| 5,180,996 | 1/1993 | Shiga ................................. | 331/77 |
| 5,187,451 | 2/1993 | Nakamoto et al. ................. | 331/99 |
| 5,200,600 | 6/1993 | Shinagawa ......................... | 235/492 |
| 5,212,373 | 5/1993 | Fujioka et al. ..................... | 235/492 |
| 5,412,192 | 5/1995 | Hoss .................................. | 235/380 |
| 5,424,724 | 6/1995 | Shieh ................................. | 235/384 X |

FOREIGN PATENT DOCUMENTS

| | | | |
|---|---|---|---|
| 0258193 | 10/1989 | Japan ................................. | 235/491 |
| 0093886 | 4/1990 | Japan ................................. | 235/491 |
| 9120067 | 12/1991 | WIPO ................................ | 235/384 |

OTHER PUBLICATIONS

John W. Boyles, "The Oscillator as a Reflection Amplifier: an Intuitive Approach to Oscillator Design", Microwave Jr. Jun. 1986 pp. 83–98.

Philip G. Wilson, "An Easy to Use FET DRO Design Procedure Suited to Most CAD programs", Jan. 1989 IEEE MTT-S Digest, pp. 1033–1036.

Guillermo Gonzalez, "Microwave Transistor Amplifiers; Analysis and Design", Prentice Hall, Mar. 1984, pp. 194–214.

*Primary Examiner*—Donald T. Hajec
*Assistant Examiner*—Thien Minh Le

[57] ABSTRACT

An Integrated Circuit (IC) card is powered by an array of photovoltaic cells with an Electrically Erasable Programmable Read Only Memory (EEPROM) with associated electronic to read the EEPROM and generate a serial bit stream that modulates a Frequency Shift Keying (FSK) RF system employing a Dielectric Resonant Oscillator (DRO) and a matched dipole antenna. The IC card is totally passive and derives its energy from an external source of radiant energy upon the array of photovoltaic cells resident in the IC card. The IC card is capable of remote interrogation which enables the IC card to be used for traffic and personnel monitoring as well as credit card applications.

2 Claims, 2 Drawing Sheets

1

IDENTIFICATION CARD WITH RF DOWNLINK CAPABILITY

This is a continuation in part of Ser. No. 162,759 filed Dec. 7, 1993, now abandoned.

REFERENCES CITED

U.S. PATENT DOCUMENTS

| | | | |
|---|---|---|---|
| 3,090,042 | 01/1962 | Kleist et al | 343/6.5 |
| 4,575,621 | 03/1986 | Dreifus | 235/380 |
| 4,650,981 | 03/1987 | Foletta | 235/449 |
| 4,701,601 | 10/1987 | Francini et al | 235/449 |
| 4,791,283 | 12/1988 | Burkhardt | 235/438 |
| 4,912,471 | 03/1990 | Tyburski et al | 342/42 |
| 4,916,296 | 04/1990 | Streck | 235/454 |
| 4,960,983 | 10/1990 | Takesi | 235/449 |
| 5,212,373 | 05/1993 | Fujioka et al | 235/492 |
| 4,149,127 | 04/1979 | Murakami et al | 331/96 |
| 4,707,669 | 11/1987 | Mekata et al | 331/96 |
| 5,180,996 | 01/1993 | Shiga | 331/77 |
| 5,187,451 | 02/1993 | Nakamoto et al | 331/99 |

OTHER PUBLICATIONS

John W. Boyles, "The Oscillator as a Reflection Amplifier: an Intuitive Approach to Oscillator Design", MICROWAVE JOURNAL June 1986, pp. 83–98.
Philip G. Wilson, "An Easy-To-Use FET DRO Design Procedure Suited To Most CAD Programs", 1989 IEEE MTT-S Digest, pp. 1033–1036.
Guillermo Gonzalez, "Microwave Transistor Amplifiers: Analysis and Design", Prentice Hall, 1984, pp. 194–214.

FIELD OF THE INVENTION

The present invention relates to the use off, array of photovoltaic cells to power a passive Integrated Circuit (IC) card that has a wireless RF communication downlink with interrogation terminals.

BACKGROUND OF THE INVENTION

This invention relates to the next evolution of IC cards wherein an RF downlink communication capability is incorporated into the IC card so that noncontact remote interrogation of the IC card is permitted.

The backbone of credit card communication is the magnetic stripe which is scanned by appropriate readers within remote terminals for the verification of transactions or the delivery of cash. The advantage of the magnetic stripe is that it is an entirely passive device with a non-volatile memory. The disadvantages are that it requires manual insertion into a reading device and that the amount of static information which can be stored is limited. One obvious way to limit credit card fraud is to increase the amount of personal data such as fingerprints and portraits contained within each credit card; this, however, is far beyond the capabilities of the magnetic stripe.

The requirement for increased data capability implies the need for a smart-card or integrated circuit (IC) card with its attendant memory capability. However, the Credit Card Industry has been slow to adopt IC cards due to their inherent problems. Such cards are often unreliable, due largely to the need for metallic contacts to couple the card to a card reader. The contacts are readily tarnished, have a short useful life and require a precision card reading mechanism.

A solution to this problem is proposed in U.S. Pat. Nos. 4,701,601 (Francini) and 4,791,283 (Burkhardt) wherein the identification data is transfered from the IC card by using magnetic stripe emulators. This prior art increases the storage capability of the credit card, but does not improve the communication of the credit card with the terminal. Other solutions involving communication via magnetic induction are proposed in U.S. Pat. Nos. 4,650,981 (Foletta) and 4,960,983 (Takesi).

Another example of an IC card transaction device is shown in U.S. Pat. No. 4,575,621 (Dreifus), which uses optical coupling for communication. All these proposals require manual insertion of a IC card into a terminal, which limits their application.

IC cards have been evolving in a manner similar to telephone technology and are utilizing wireless Radio Frequency for communication rather than magnetic stripes, metallic contacts or magnetic induction. A recent example of this technology is disclosed in U.S. Pat. No. 5,212,373 (Shuzo Fujioka, et al) which defines a noncontact IC card employing an RF interface.

These approaches require a battery powered credit card which diminishes its utility. Credit cards and other identification cards need to be totally passive which is why they are so useful, whereas IC cards are usually battery powered. To solve the power problem, some passive transponders, for example, have been used in various automatic identification schemes for vehicles such as automobiles and railroad cars. These have applications for monitoring the location of freight cars and the automatic collection of toll fees for vehicular traffic on a nonintrusive basis.

The key to this technology is passive responders deriving their energy from external sources. These sources are either the motion of a conductor through a magnetic field for moving traffic or a conductor in an oscillating magnetic field for stationary traffic. Examples of this application are disclosed in U.S. Pat. Nos. 3,090,042 (Kleist) and 4,912,471 (Tyburski).

These approaches to energizing passive responders have serious shortcomings when applied to electronics embedded in small plastic cards as exemplified by credit cards, driver licences, identification badges and IC cards in general. The size of the conductors is constrained by the size of the plastic card which in turn limits the induced voltages and therefore the power to drive the responder. In these cases, a more directed form of energy is required for passive responders on a smart card and this can be provided by a directed beam of radiant energy onto a large array of photovoltaic cells covering the card. For nonintrusive interrogation, especially at night, infrared illumination may be used. U.S. Pat. No. 4,575,621 (Dreifus) uses optical coupling for both communication and energy transfer to a portable electronic transaction device to avoid mechanical contact problems. But this is performed within the confines of a terminal slot and does not permit remote interrogation. Furthermore, the portable electronic transaction device contains a battery which limits the usefulness of the disclosure since credit cards should, of necessity, be totally passive. In U.S. Pat. No. 4,916,296, which is conceptually similar to Dreifus' disclosure, Streck advocates the use of solar cells to provide energy, but confines his disclosure to optical(infra-red) communication which appears simpler than RF communication. However, simple on-card RF communication is possible by using Dielectric Resonant Oscillators (DRO) which are based on the instability of some transistor amplifier configurations.

An excellent introduction to this subject is Boyles' paper on the oscillator as a reflection amplifier in which the transistor has a negative resistance, sustains the reflections, and defines explicit criteria for oscillations to occur. Following this, the paper by Wilson and others gives a useful design procedure for DROs employing Field Effect Transistors (FET). However, the most important aid in the design of DROs is the authoritative work by Gonzalez on Microwave Transistor Amplifiers.

Remarkably, this is fertile field for patents as exemplified by U.S. Pat. No. 4,149,127 for an early dielectric resonator stabilized microstrip oscillator and U.S. Pat. No. 4,707,669 for a dielectric resonator microwave oscillator whose circuit parameters are optimized to give enhanced negative resistance. More recently, U.S. Pat. No. 5,180,966 defines a DRO having an improved output filter and U.S. Pat. No. 5,187,451 minimizes the microstrip width and length for a specific DRO.

By using a DRO based on microstrip technology and utilizing a single FET, a simple on-card RF system is defined that employs Frequency Shift Keying (FSK) to modulate the carrier and transmit the identification data. This is based on the fact that the frequency of oscillation is inversely proportional to the gate-to-source capacitance. Since this capacitance varies with the gate-to-source bias, it provides a simple mechanism for modulating the carrier. By coupling this bias to the data stream, an FSK modulation system is achieved.

With regard to terminals to support the RF interface, many electronic companies have developed systems that enable the wireless transmission of digital data from computer to computer to be performed. Specifically, these systems are for small offices to avoid wiring problems. These systems with minor modifications to the carrier frequency, signal modulation data format and the addition of a radiant energy source, can serve as the interrogation terminals and can be specifically tailored to applications such as automatic teller support, traffic monitoring, or general identification and surveillance services.

An array of photovoltaic cells is an obvious way to provide sufficient energy to power a passive device. Furthermore, directed beams of radiant energy serve as the interrogation query of the IC card, or equivalently the communication uplink. This mode of informationless uplink is possible, because once the IC card is energized the identification data can be automatically transmitted over the IC card's RF downlink without any need to turn the IC card on or off. Also, the radiant energy uplink and the RF downlink do not have to be performed within the confines of some reader apparatus. This means that remote interrogation of the IC card can be performed opening up a whole spectrum of applications for the IC card beyond banking transactions, ranging from traffic monitoring to passport control, data entry and areas of surveillance.

OBJECTIVES OF THE INVENTION

Accordingly, it is the general objective of the invention to provide an IC card which overcomes the limitations of the prior art.

It is an objective of this invention to provide an IC card that is capable of a multiplicity of uses including credit cards, driver licences and other identification cards such as social security cards and passports.

It is an objective of this invention to provide an IC card that is completely passive in the sense that it does not contain any internal power sources such as batteries.

It is an objective of this invention to provide an IC card with an embedded transmitter that provides RF communication with interrogation terminals.

It is an objective of this invention to provide an IC card with an embedded electrically erasable programmable read only memory (EEPROM) capable of storing all required identification data and associated communication framing data.

It is an objective of this invention to provide an IC card with an array of photovoltaic cells to capture radiant energy and energize the embedded electronics in the IC card.

It is an objective of this invention to use low power RF signals transmitted by the responder so that FCC operating licences or FCC approval is avoided.

SUMMARY OF THE INVENTION

An IC card with remote interrogation capability is proposed which incorporates an RF transmitter together with an electrically erasable programmable read only memory (EEPROM) to store identification data and communication framing data; associated electronics to read the EEPROM and convey the data to the RF transmitter and an array of photovoltaic panels to collect radiant energy to drive the system.

Once the card is illuminated with a directed beam of radiant energy the controller continuously cycles through the EEPROM memory to read the data. This data is FSK modulated onto an RF signal and sent by the transmitter for interception by the interrogation terminal receivers for further processing. When the card is no longer illuminated with radiant energy, it assumes a dormant state.

DETAILED DESCRIPTION

Referring now in greater detail to the various figures there is shown an IC card of the subject invention that is capable of remote interrogation.

Figure 1:
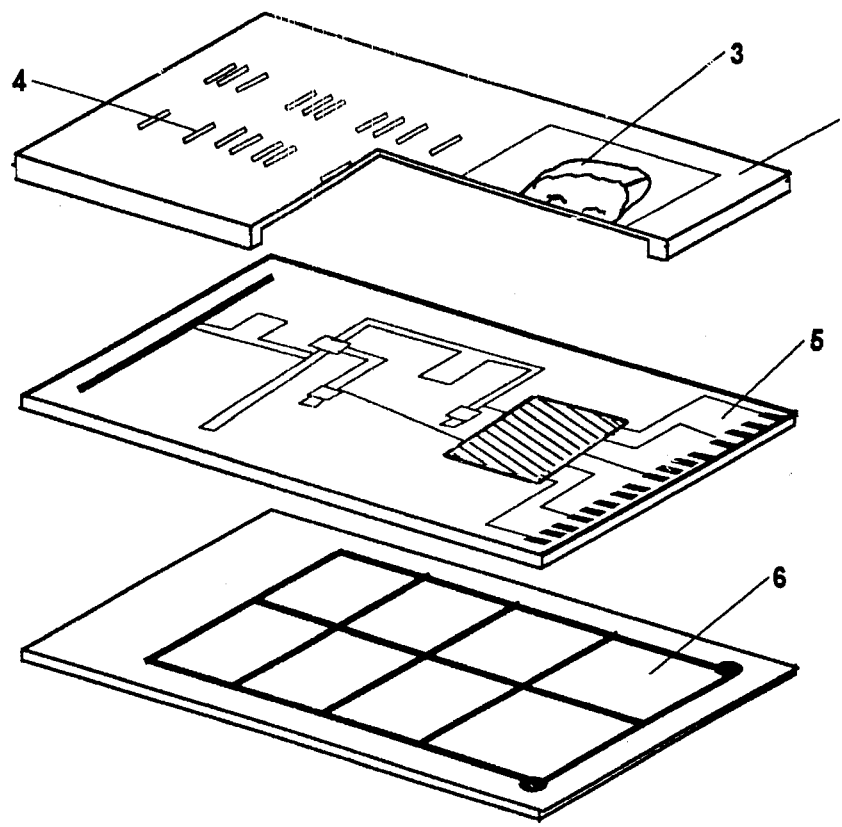
FIG. 1 is a pictorial view of the IC card indicating the three essential layers of the IC card: the front plastic protective cover with embossed data and other imagery depending on the application: the interior layer showing the electronics, and the final layer showing the array of photovoltaic cells.

The IC card is an electronic device whose components are encapsulated in a plastic body in the form of a flat card, similar to a conventional credit card. Since the card does not have to be inserted into a slot to be read, its physical dimensions do not necessarily have to conform to the standard credit card size. For passport applications, the card can be larger to include a standard passport photograph 3 as illustrated in FIG. 1. Other embossed data 4 may be included on the front face of the card and this will be determined by the various transactions and functions the card has to perform. The electronics layer 5 contains a Dielectric Resonator Oscillator circuit 7, a digital circuit 22 and a matched dipole 20. The third layer contains the photovoltaic cells 6 that power the system.

Figure 2:
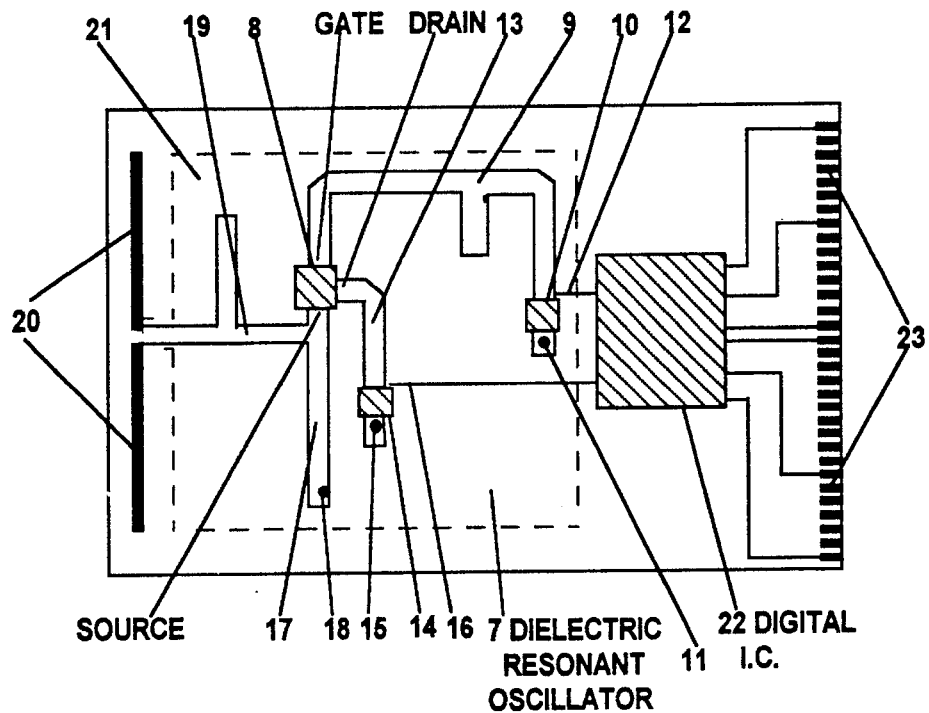
FIG. 2 is a block diagram of the RF and digital circuitry showing the Dielectric Resonant Oscillator (DRO) coupled to a dipole antenna together with the digital integrated circuit.
Figure 3:
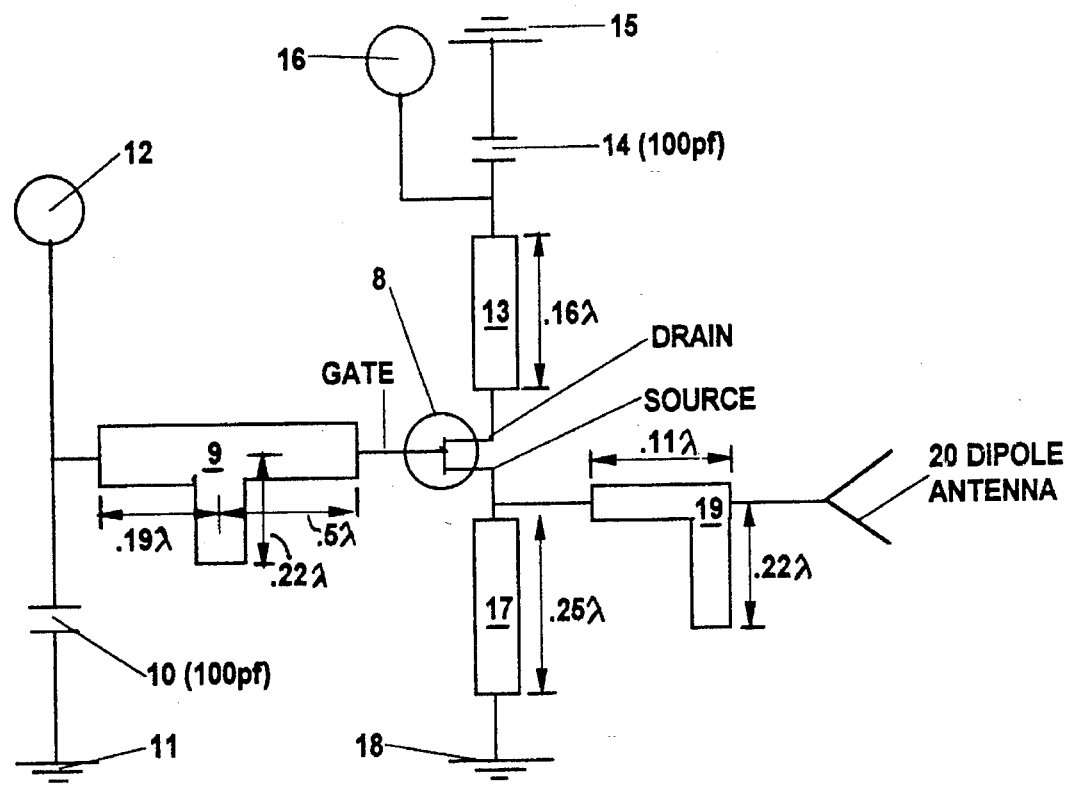
FIG. 3 is a schematic of the DRO.

FIG. 2 shows a microstrip version of the DRO with a companion schematic shown on FIG. 3. The design illustrated was derived from a Mathcad Program using a generic FET and employing a 50 Ohm impedance microstrip. The FET 8 has a gate (G), a drain (D) and a source (S). The resonant oscillatory microstrip circuit 9 is connected to G and terminates in a DC block capacitor 10 and is grounded by a "via" 11. The gate bias is supplied as the 10 MBPS (Mega Bits Per Sec) serial bit stream generated by the Digital IC 22 to the oscillatory circuit 9 by the connection 12. Changing the gate bias changes the DRO's frequency and provides a very simple FSK modulation for the RF system. Depending on the FET characteristics, approximately a 3 to 4% shift in frequency should be achieved with this method of modulation. The drain is connected to the inductive microstrip 13 which is terminated in a DC block capacitor 14 and grounded by the via 15. At resonant frequencies the capacitor 14 acts as a bypass capacitor. The power is supplied to the drain circuit by the connection 16. The source is connected to ¼ wavelength microstrip 17 to reinforce the oscillation and by a matching microstrip with an open-circuited stub 19 to the dipole antenna 20. The boundary of the microstrip base 21 is shown in FIG. 2 and is chosen not to inhibit the radiation of the dipole antenna.

The dipole antenna 20 is matched to ½ wavelength of the base frequencies which is selected to be 4.0 GigaHertz. This defines the length of the dipole antenna 20 to be 3.75 cms which lies within the boundaries of the IC card. Since the antenna is constrained to the size of the card, operating the RF system at much lower frequencies will result in reduced antenna efficiencies.

Figure 4:
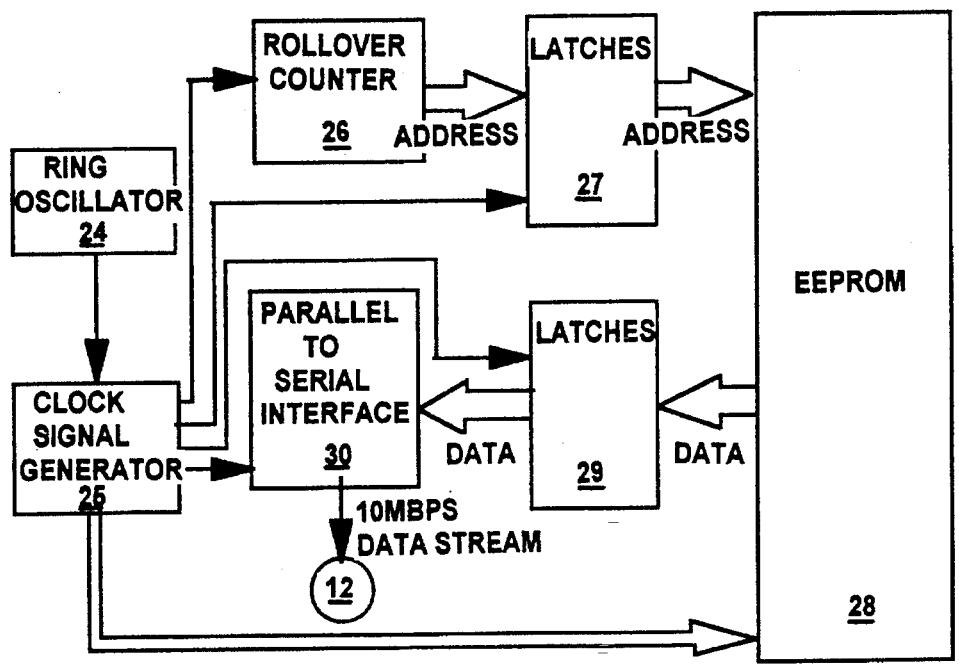
FIG. 4 is a block diagram of the digital circuit showing the EEPROM and associated electronic functions.

The functions of the digital circuit are shown on FIG. 4 and consist of reading the EEPROM 28 data, converting it to a serial stream for FSK modulation of the RF carrier. A 10 MHz clock is generated by a ring oscillator 24 and sent to the clock signal generator 25 which produces all the timing signals with appropriate delays for the functioning of the digital circuitry. The addresses for the EEPROM 28 are provided sequentially by a rollover counter 26 which spans the word(or byte) range of the EEPROM 28. The addresses are latched into the EEPROM by the latches 27 and the corresponding data words sent to latches 29 for retrieval by the parallel to serial interface 30. The output is a 10 MBPS stream of digital data that is sent to the FET gate circuit 9 by the connection 12. The EEPROM is programmed with data by external means through the connection interface 23, as shown on FIG. 2, and this function is performed prior to encapsulation. Once the IC card has been encapsulated the interface 23 is not accessible. The IC card should be capable of de-encapsulation without violating the electronics layer 5 or the photovoltaic cell layer 6, thus it can be reused.

The IC card driven by photovoltaic cells has limited power. For a conventionally sized credit card illuminated by solar power, the available power is slightly less than half a watt. This constrains the degree of sophistication that can be incorporated into the IC card. The sophistication therefore has to be built into the interrogation terminals which will have the power resources and processing capabilities necessary to perform them. This sophistication is required in two basic areas. The RF circuit 7 (FIG. 3) contains a Dielectric Resonator Oscillator DRO that is used to generate the high frequency signals for the FSK modulated carrier. The limited power resource dictates a crude DRO devoid of any frequency stabilization as illustrated in FIG. 2. Furthermore, the signal modulation is limited to FSK, since the power is not available to drive the additional FETs required for phase shift keying(PSK) modulation. Minor fluctuations within the two primary frequencies of the FSK modulation and frequency transients induced by the frequency switching have to be compensated for in the interrogation terminal. Similarly, the digital circuit 22 (FIG. 4) has a 10 MHz clock that is generated by an astable ring oscillator, thus avoiding a crystal, which can be constructed within an integrated circuit and minimizes the thickness of the IC card. Once again the interrogation terminal has to determine the fluctuation in bit rate to maintain lock on the data stream.

The significant identification data will be resident in the EEPROM 28 (FIG. 4). Prior to encapsulation the identification data can be programmed into the EEPROM via the contact interface 23 (FIG. 2) and this function will be performed by the issuing agency. The memory size of EEPROMs can be very large so that image data and fingerprint data can be incorporated into the identification data. In fact, a 512 k (64k×8) EEPROM is recommended, since the typical power to operate such a device in read mode is less than 100 mW (Intel 28f512). Once again the amount of identification data to be included will depend on the application.

The operational concept of the IC card is very simple. The interrogation query of the IC card is provided by an incident beam of radiant energy on the photovoltaic cells 6. This powers up the system which will continuously cycle through the EEPROM data and transmit it until the interrogation query ceases, that is the radiant source of energy is turned off. At this point the IC card assumes a dormant state. During this operation, the EEPROM data remains unaltered.

Since the interrogation query does not contain any information, the data resident in the EEPROM must be unencrypted. For applications monitoring people and traffic, this does not present a problem. Banks may employ static encryption to avoid quick access to sensitive information, but for usual ATM banking transactions involving cash, a Personal Identification Number PIN should be used to avoid fraud.

As a rule the IC card would be confined to a wallet or purse until it is retrieved for use, as is the custom for credit cards, which limits the indiscriminate transmission of data. However, for traffic monitoring, the drivers licence or equivalent card can be inserted into a fixture that is positioned at a convenient corner of a window so that it does not obscure the driver's vision, yet is visible to traffic monitors. The terminal for such applications can be handheld guns to direct the beams of radiant energy on selected traffic. To avoid interfering with the driver's ability, the radiant beam of energy can be infra-red or the IC card can be mounted at some unobtrusive place such as the rear window of the vehicle. The associated electronics and display can be packaged within the gun or resident within patrol cars or traffic stations. Since the transmitted energy is less that 20 dBm (100 mW), the energy intensity at an interrogation distance of 10 meters is −51 dBm/sq.cm. (7.96 $10^{-6}$ mw/sq.cm.) so that a small dish antenna is required to capture the signal. With traffic monitoring it is possible to have a multiplicity of signals being transmitted due to activation of the IC cards by direct sunlight. In this case the signals can be separated by the beamwidth of the small dish antenna. If there is more than one vehicle in the line of sight, the space loss of the further vehicle will preclude it from being detected.

For passport control and limited personal access, the IC cards may be handheld with the photovoltaic cell array visible as personnel pass interrogation stations. The terminals will capture the identification data and correlate it with data bases for access. One of the more important aspects of this invention is the automatic digital input of data it provides in areas such as passports and driver licences where none existed before.

While there is little new about the disparate elements of the IC card, combined they form a unique system that has considerable utility and application. Basically, the specification defines the simplest RF interface possible coupled to an EEPROM that can be powered by less than half a watt and still be small enough to be embedded onto a plastic card. Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. An IC card device comprising:

a) an array of photovoltaic cells covering one side of the IC card, that when illuminated with radiant energy provides power to the system and automatically activates the system to transmit an RF signal;
  b) an externally programmable EEPROM to store data with associated electronics to cyclically read the EEPROM and generate a serial bit stream;
  c) an RF interface consisting of a FET microstrip driven DRO coupled to a match dipole antenna wherein the serial bit stream is used to vary the FET gate bias and generate an FSK modulated signal that is transmitted via the dipole antenna;
  d) and, the whole system is preprogrammed with relevant ID data and encapsulated onto a plastic card.

2. The IC card of claim 1 wherein the DRO's frequency is approximately 4 GHz and the transmitted bit stream rate is approximately 10 MHz.

* * * * *